United States Patent
Nakao (10) Patent No.: US 8,572,240 B2
(45) Date of Patent: Oct. 29, 2013

(54) MONITORING SYSTEM

(75) Inventor: Toshiaki Nakao, Hirakata (JP)

(73) Assignee: Panasonic Corporation, Osaka (JP)

(*) Notice: Subject to any disclaimer, the term of this patent is extended or adjusted under 35 U.S.C. 154(b) by 422 days.

(21) Appl. No.: 12/934,075

(22) PCT Filed: Mar. 31, 2009

(86) PCT No.: PCT/JP2009/056696
§ 371 (c)(1),
(2), (4) Date: Sep. 23, 2010

(87) PCT Pub. No.: WO2009/123204
PCT Pub. Date: Oct. 8, 2009

(65) Prior Publication Data
US 2011/0016213 A1 Jan. 20, 2011

(30) Foreign Application Priority Data
Mar. 31, 2008 (JP) .................... 2008-093881

(51) Int. Cl.
*G06F 15/173* (2006.01)
(52) U.S. Cl.
USPC ........... 709/224; 709/212; 709/213; 709/214; 709/215; 709/216; 709/223; 709/225; 709/226; 709/204; 709/205
(58) Field of Classification Search
None
See application file for complete search history.

(56) References Cited

U.S. PATENT DOCUMENTS

| 2003/0099221 A1* | 5/2003 | Rhee ........................ 370/338 |
| 2005/0152358 A1 | 7/2005 | Giesberts et al. |
| 2005/0152359 A1 | 7/2005 | Giesberts et al. |
| 2005/0157715 A1 | 7/2005 | Hiddink et al. |
| 2006/0121918 A1* | 6/2006 | Nakakita et al. ............ 455/458 |

FOREIGN PATENT DOCUMENTS

| JP | 61-198944 A | 9/1986 |
| JP | 10-174180 A | 6/1998 |
| JP | 10-242965 A | 9/1998 |
| JP | 2006-54832 A | 2/2006 |
| JP | 2007-37196 A | 2/2007 |

OTHER PUBLICATIONS

International Search Report for the Application No. PCT/JP2009/056696 mailed May 12, 2009.

* cited by examiner

*Primary Examiner* — Huy D Vu
*Assistant Examiner* — Teisha D Hall
(74) *Attorney, Agent, or Firm* — Renner, Otto, Boisselle & Sklar, LLP (57) ABSTRACT

A monitoring system includes a center device and terminal devices. The center device is configured to return a first response if receiving a first request from a terminal device. At this instance, if having a request to another terminal device, the center device includes designation information for designating said another terminal device in the first response. The terminal device receiving the first response, if the designation information is included in the first response, transfers the designation information to a corresponding terminal device. The corresponding terminal device transmits a second request to the center device if receiving the designation information. Thereby, the center device can promptly transmit the request with respect to said another terminal device to the terminal device.

12 Claims, 4 Drawing Sheets

MONITORING SYSTEM

TECHNICAL FIELD

The invention relates to a monitoring system for performing communication between a center device and terminal devices each of which is provided with a monitored device (the apparatus that is an object of supervisory control), thereby performing supervisory control of the monitored devices through the center device.

BACKGROUND ART

A monitoring system in which terminal devices can communicate with a center device has been traditionally provided (see Japanese Patent Application Publication No. 2006-54832). In order to monitor or control the operations of apparatuses (monitored devices), each terminal device is provided with an apparatus(es), and the system transmits and receives monitoring or control information of the devices between the center device and the terminal devices.

In this sort of monitoring systems, there is a generally employed configuration in which a center device performs polling with respect to each of terminal devices and the center device obtain monitoring or control information of apparatuses from the terminal devices.

On the other hand, there is a configuration in which, in case a router is provided at the side of a terminal device(s) between a center device and the terminal apparatus(es) and the communication from the center device to the terminal device(s) is prohibited, request information can be transmitted from the center device to the terminal device(s) only by responding a request (question) from the terminal device(s) to the center device.

Timing for receiving request information per terminal device is defined as a constant (transmission time) interval in general in configurations such as, as presented above, the configuration in which the center device performs polling with respect to the terminal devices and thereby request information is transmitted from the center device to the terminal devices, or the configuration in which request information is provided from the center device to the terminal device(s) by responding to a request from the terminal device(s) to the center device. That is, timing, by which monitoring information is transmitted from each terminal device to the center device and control information is transmitted from the center device to each terminal device, is a constant (transmission time) interval.

Therefore, even if request information to be transmitted to a specified terminal device is generated in the center device, it is necessary to wait up to the timing at which another request information can be transmitted to the terminal device, and thereby a delay time occurs from the generation of the request information to the actual transmission of the request information.

In order to reduce the delay time when request information is transmitted from the center device to the terminal device, it is conceivable that the aforementioned transmission interval should be shortened. However, if the number of the terminal devices communicating with the center device is increased, each allotted time of the terminal devices becomes short. Accordingly, speeding up the communication speed is required, and the processing load of the center device is increased.

DISCLOSURE OF THE INVENTION

The present invention is provided in view of the above reasons, and an object is to provide a monitoring system capable of transmitting request information to a terminal device and reducing delay from the generation request information at a center device without increase of the center device's processing load and speedup of the communication speed.

A monitoring system of the present invention comprises a plurality of terminal devices and a center device. The terminal devices comprises a monitored device each, and is configured to be capable of communicating with each other. The center device is configured: if receiving a first request from a terminal device at a specified time schedule, to return a first response including request information with respect to the terminal device; and thereby to transmit the request information to the terminal device. In an aspect of the invention, the center device comprises a designation response means configured, when receiving a first request from any of the terminal devices, if having request information to another terminal device, to return a first response including designation information designating said another terminal device. Each of the terminal devices comprises: a designation notice means configured, when the designation information is included in the first response from the center device, to transfer the designation information to said another terminal device; and an interruption processing means configured, if receiving designation information designating itself, to transmit a second request to the center device.

In this invention, interruption processing can be executed at a timing different from the time schedule. That is, it is possible to transmit request information to a terminal device, reducing delay from the generation request information at the center device without increase of the center device's processing load and speedup of the communication speed. Each terminal device only has to be provided with the processing corresponding to designation information besides the conventional function for executing the processing in response to a first response with respect to a first request. In even the interruption processing, it is unnecessary to change proceeding for transmitting and receiving information with respect to the center device, and accordingly it is possible to prevent the proceeding between the center device and each terminal device from becoming complex.

In an embodiment, the monitoring system comprises a router located at the side of the terminal devices between the terminal devices and the center device. The center device is configured, when including said designation information in the first response with respect to the first request from the terminal device, to limit a range to terminal devices under the same router as the terminal device having transmitted the first request, said range being a range of the terminal devices to which the designation information is to be transmitted. In this embodiment, if each terminal device can communicate only between the terminal devices under the same router, it is possible to transmit information to other terminal devices without excessive time delay. The communication between the terminal devices does not leak outside of the router. When a wide area network such as internet is used, communication confidentiality can be enhanced and traffic in a wide area network can be prevented from increasing.

In an embodiment, each of the terminal devices comprises an identification data holding means for holding local identification data of each of terminal devices existing under the same router. Said designation response means is configured, when including said designation information in said first response to the terminal device, to relate the designation information with the local identification data of said another terminal device existing under the same router as that of its own terminal device. Said designation notice means is configured, if another terminal device's local identification data is included in said first response from the center device, to transfer designation information related to the local identification data to the terminal device having the local identification data. In this embodiment, when notice of the information to the terminal device is designated, it is possible to easily judge whether or not it is the information addressed to the terminal device under the router. If local identification data is used for terminal device's identification data, each terminal device needs to have each identification data of other terminal devices, but the number of identification data is few and accordingly the storage capacity for storing each identification data becomes small.

In an embodiment, the center device comprises a request response means configured to include, in said first response to the terminal device, request information as a second request with respect to another terminal device and address information of said another terminal device related to the request information. Each of the terminal devices comprises a request notice means configured, if another terminal device's address information is included in said first response from the center device, to transfer request information as a second request related to the address information to the terminal device having the address information. In this embodiment, designation information can be used for designation as it is to notify other terminal devices, and processing at the terminal device with respect to a response from the center device becomes simple. If address information is used for terminal device's identification data, the varieties of identification data becomes large and accordingly a large storage capacity is required in order to storage each identification data, but the center device can unify management of identification data of each of the terminal devices.

In an embodiment, each time schedule of the terminal devices, for transmitting first requests to the center device, is set to a constant transmission interval per terminal device so that a terminal device has a shorter transmission interval as having a higher occurrence frequency of request information from the center device. In this embodiment, the center device can set each time schedule so that a terminal device can transmit a first request at a shorter transmission intervals as having a higher occurrence frequency of request information. Accordingly, an interruption processing ratio can be reduced. If receiving a first response from the center device, each terminal device executes the processing in response to request information by itself without notifying designation information to other terminal devices in a lot of cases, thereby enhancing response. In addition, it is possible to restrain increase of processing load owing to notice of designation information from a terminal device to another terminal device.

In an embodiment, the center device comprises a history storage means for storing a history of transmitted request information per terminal device. The occurrence frequency of request information to each of terminal devices is evaluated from the history stored in the history storage means. Said transmission interval is changed in response to time change of the occurrence frequency. In this embodiment, the center device can evaluate the occurrence frequency of request information to each of terminal devices from the history, and transmission interval for transmission of a first request from each terminal device to the center device can be made proper.

In an embodiment, the center device comprises a schedule setting means. The schedule setting means is configured: (i) to evaluate the number of the terminal devices based on communication with each of the terminal devices; (ii) to determine each time schedule of the terminal devices so that a transmission interval corresponds to the center device's processing ability based on the number of the terminal devices; and (iii) to transmit a corresponding time schedule to each of the terminal devices. In this embodiment, each terminal device transmits a first request at transmission intervals in line with the center device's processing ability and the number of the terminal devices. Accordingly, even if the number of the terminal devices is increased, excessive increase of the center device's processing load can be restrained, and the transmission interval for each terminal device's question can be prevented from being excessively lengthened.

In an embodiment, each time schedule of the terminal devices, for transmitting a first request to the center device is set to a constant transmission interval per terminal device. The center device comprises a load estimation means configured to estimate its own processing load. Said schedule setting means is configured, if obtaining a larger processing load from the load estimation means, to determine each time schedule of the terminal devices so that each transmission interval of the terminal devices is more lengthened. In an embodiment, if the center device's processing load is increased, each transmission interval of first requests by the terminal devices is lengthened and accordingly the center device's processing load can be prevented from increasing.

In an embodiment, the center device comprises a request response means and a response selection means. The request response means is configured, when a first request is received from any of the terminal devices, if having request information as a second request to another terminal device, to return a first response including request information to said another terminal device. The response selection means is configured, in response to a type of the request information as the second request, to select one of the designation response means and the request response means to transmit a first response to the terminal device. Each of the terminal devices comprises a response discrimination means, a request notice means and a request processing means. Said response discrimination means is configured to decide whether the first response with respect to a first request includes designation information or request information as a second request. Said request notice means is configured, when request information as a second request to another terminal device is included in a first response from the center device, to transfer the request information as the second request to said another terminal device. Said request processing means is configured, if request information as a second request is transferred from another terminal device, to execute the processing corresponding the request information. In this embodiment, if request information to another terminal device is conventional request information, only designation information is included in a first response, thereby restraining increase of information amount of a first response from the center device. Moreover, each terminal device executes the processing corresponding to a first request, a first response and request information to itself, and accordingly each terminal device's processing load can be reduced in comparison with the case that request information as a second request is transferred to another terminal device. On the other hand, if request information to another terminal device is request information that prompt processing is required, request information as a second response is included in a first response, and thereby processing can be performed without delay as well as repeating a first request and a first response with respect to the center device.

In an embodiment, each of the terminal devices comprises a completion notice means configured, after executing the processing corresponding to the request information as the second request, to transmit a second response representing completion of the processing to the center device. In this embodiment, the center device can confirm that request information as a second request reaches a corresponding terminal device.

In an embodiment, each of the terminal devices comprises a monitored device.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

First Embodiment

Figure 1:
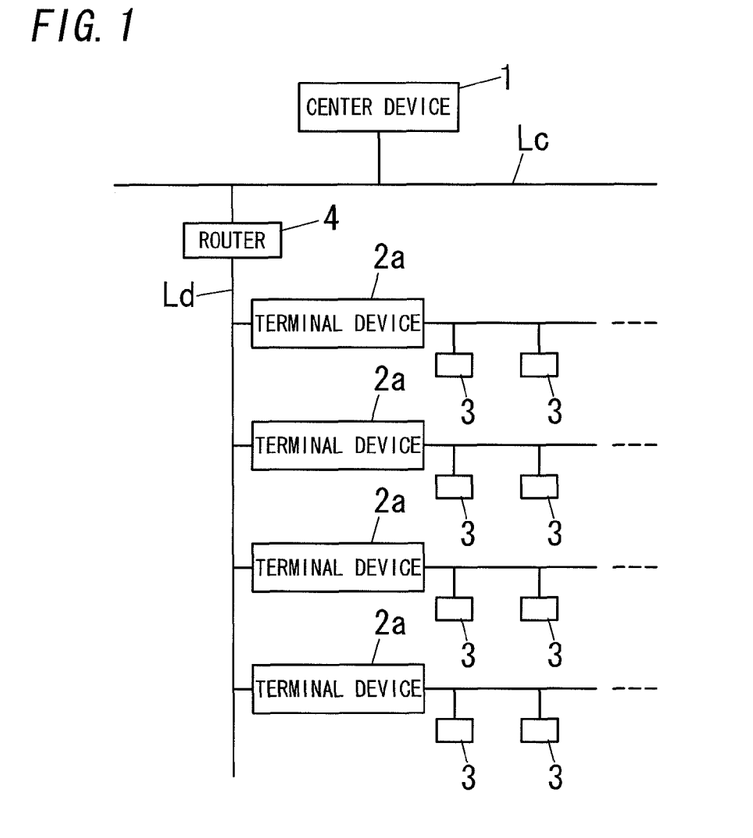
FIG. 1 illustrates a configuration example of a monitoring system in accordance with an embodiment of the present invention.

In a monitoring system of an embodiment (e.g., a control monitoring system) to be described below, as shown in FIG. 1, a center device 1 and a plurality of terminal devices 2a-2d (in the indicated example four, but more devices may be provided) are defined as communicating through communication lines Lc and Ld. In addition, the center device 1 and each of the terminal devices 2a-2d are explained as communicating by a server client method. The center device 1 is formed of: a computer including at least one CPU, a storage device and programs; a communication function (e.g., a communication device such as a network interface compliant to IEEE 802.3 or the like); a timer and so on, and has various means (see FIG. 4A). Each of the terminal devices 2a-2d includes an embedded computer (at least one CPU and a storage device) as a core as well as a communication function (e.g., a communication device such as a network interface compliant to IEEE 802.3 or the like), a timer and so on, and has various means (see FIG. 4B). Each terminal device 2 is connected with apparatuses 3 (monitored devices), each of which performs monitoring and control, through a signal line Ls. Accordingly, each terminal device 2 includes a second communication device (e.g., a communication device for a time division multiple access system) for communicating the apparatuses 3. For example, a light fixture or a measurement hardware is used as an apparatus 3, and has identification data.

When light fixtures as apparatuses 3 are connected to a terminal device 2, a control signal including identification data of each light fixture is transmitted through the signal line Ls, and thereby each light fixture can be controlled to turn on and off, and also each light fixture's on/off state can be monitored. On the other hand, when a measurement hardware(s) as an apparatus(es) 3 is connected to a terminal device 2, the identification data of the measurement hardware is designated, and thereby the monitoring information measured with the designated measurement hardware can be obtained.

In the graphic example, a plurality of apparatuses 3 are connected to a terminal device 2, but each terminal device 2 may be provided with one apparatus 3. For example, a function of a terminal device 2 may be added to each light fixture or each measurement hardware.

Figure 2:
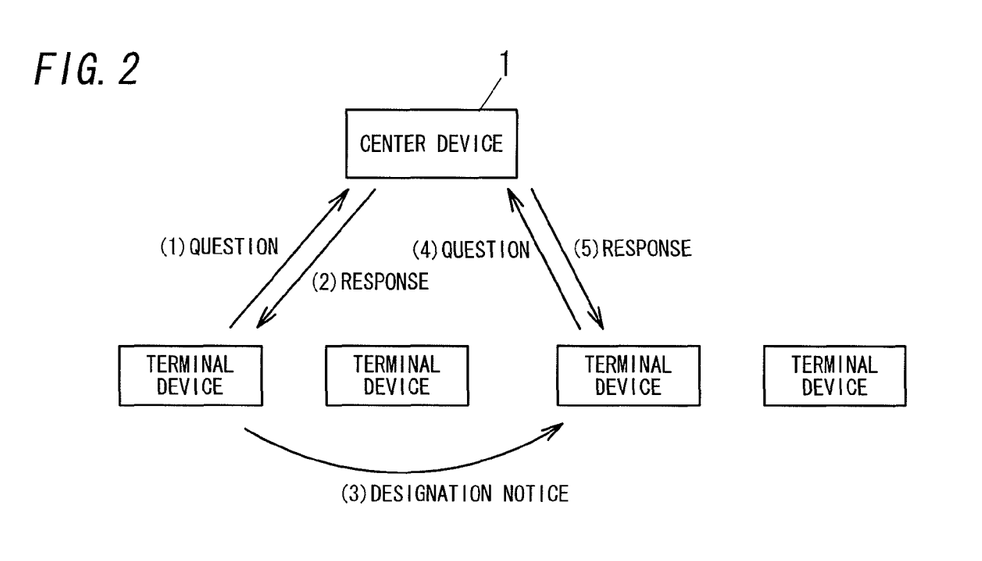
FIG. 2 is an explanatory diagram of operation of the first embodiment.

It is assumed that a wide area network such as an Internet is used as the communication line Lc, and the communication line Ld is formed of a local area network. Therefore, a router 4 is provided between the communication lines Lc and Ld. In other words, a plurality of terminal devices 2a-2d are located under the router 4. However, the configuration shown in FIG. 2 is an example. In case the communication lines Lc and Ld constitute a local area network, the router 4 is unnecessary.

After the communication network shown in FIG. 1 is constructed, the initial processing to be described below is performed in order that the center device 1 and the terminal devices 2a-2d can recognize and communicate with each other. In the initial processing, first, each of the terminal devices 2a-2d notifies (transmits) the center device 1 of its own identification data (Each of the terminal devices 2a-2d is provided with at least address information of IP address as the identification data. Under the same router, local identification data (e.g., local IP address, MAC address or the like) as unique identification data is also provided.). The local identification data is identification data available only under the router 4.

In the embodiment, the center device 1 does not perform polling with respect to each of the terminal devices 2a-2d, but each of the terminal devices 2a-2d transmits a question (a first request) to the center device 1. Request information from the center device 1 to each of the terminal devices 2a-2d is transmitted as a response (a first response) with respect to the question (see FIG. 2). The question cycle time from the whole terminal devices 2a-2d to the center device 1 is set constant, and is herein defined as one minute. In the initial processing, each time that each of the terminal devices 2a-2d puts a question to the center device 1 is not defined, but cyclically performs communication with respect to the center device 1 according to the aforementioned cycle.

The center device 1 can obtain the number of the terminal devices 2a-2d as communication opponents from identification data from each of the terminal devices 2a-2d. Accordingly, the device 1 takes account of increase and decrease of processing load in response to the number of the terminal devices 2a-2d so that the receiving interval in response to the processing ability of the center device 1 is obtained, and then determines the receiving interval for receiving each question from the terminal devices 2a-2d to the center device 1. The device 1 further determines each question (first request) time schedule of terminal devices based on each receiving interval. Setting of each time schedule is performed by a schedule setting means (see FIG. 4A). The method of determining each time schedule is described later.

Until the initial processing is completed, the terminal devices 2a-2d sequentially transmits its own identification data to the center device 1 during the aforementioned cycle. In the center device 1, if the question time schedule is determined when identification data is received, the schedule setting means 11 notifies each of the terminal devices 2a-2d of a time schedule as a response (a first response) with respect to reception of identification data. At the same time, the present time measured with the center device 1 is delivered to each of the terminal devices 2a-2d. That is, time synchronization is performed between the center device 1 and each of the terminal device 2a-2d. Thus, if the time schedule is received and time synchronization with the center device 1 is performed, the terminal devices 2a-2d sequentially finishes the initial processing.

In the embodiment, four terminal devices 2a-2d are provided and the cycle is one minute. Accordingly, the receiving interval that the center device 1 receives questions can be defined as 15-second. Therefore, the time schedules are set with respect to the terminal devices 2a-2d so that questions are transmitted at the timing of 0-second, 15-second, 30-second and 45-second per minute, respectively. The receiving intervals are even, and accordingly the packets for questions can be also used as keep-alive packets for confirming the connection of the terminal devices 2a-2d.

Figure 4A:
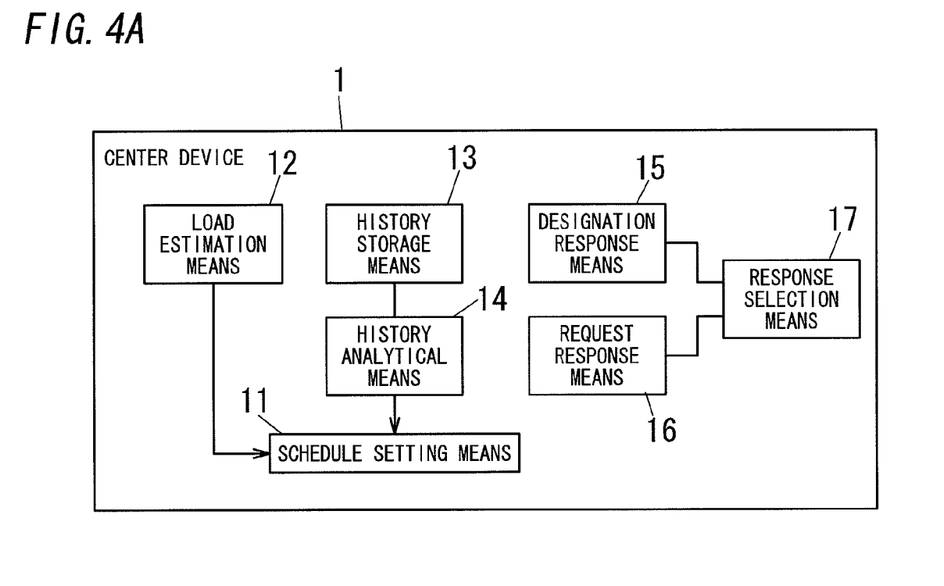
FIG. 4A is a block diagram of a center device in a second embodiment.
Figure 4B:
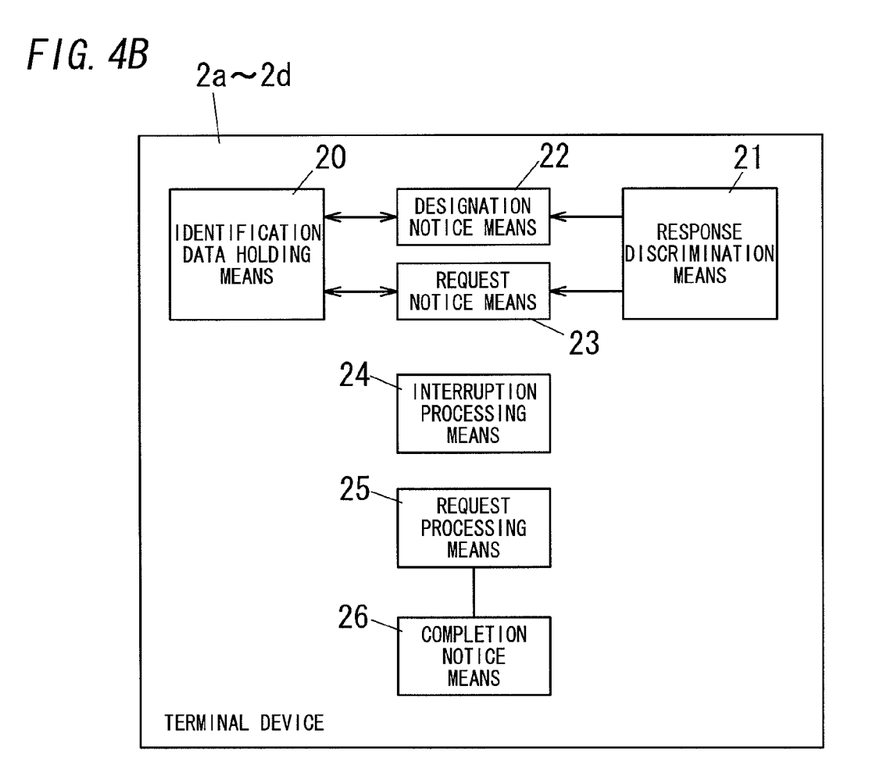
FIG. 4B is a block diagram of a terminal device in the second embodiment.

As stated above, in each of the terminal devices 2a-2d, the initial processing for the communication with the center device 1 is completed, and then the terminal devices 2a-2d collect identification information (IP address or local identification data) of each of them for the mutual communication between the terminal devices 2a-2d to put in an identification data holding means 20 (see FIG. 4B). The terminal devices 2a-2d mutually transmit and receive keep-alive packets, and thereby the processing can be performed.

If identification data of each of the terminal devices 2a-2d is address information used in a wide area network such as a global IP address, a large memory capacity for storing an identification data set is required of the center device 1. However, the center device 1 can unify management of identification data of each terminal device and also can directly designate and notify each of the terminal devices 2a-2d of request information (designation information).

On the other hand, if identification data of each of the terminal devices 2a-2d is local identification data used only under a router 4, each of the terminal devices 2a-2d needs to store identification data of each of other terminal devices 2a-2d in its own identification data holding means 20. However, the varieties of identification data is few, and accordingly the capacity for storing an identification data set becomes small. Local identification data can be reduced in information amount as compared with address information such as an IP address in general (bit number is small), and accordingly traffic can be reduced.

Figure 3:
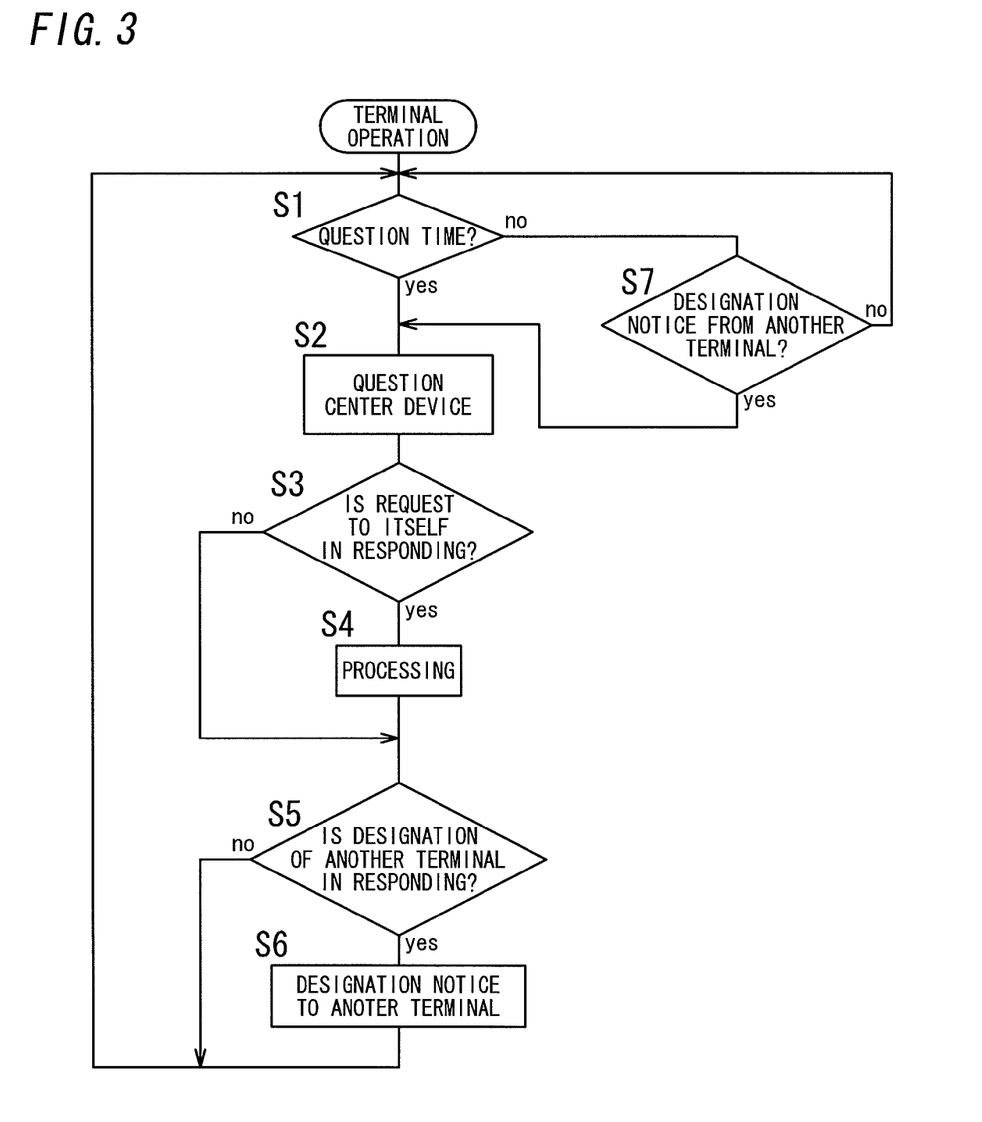
FIG. 3 is an explanatory diagram of operation of a terminal device in the first embodiment.

If the preparation described above is completed, the terminal devices 2a-2d cyclically performs communication between the center device 1 and each of the terminal devices 2a-2d with respect to the center device 1 in accordance with the aforementioned time schedule. That is, as shown in FIG. 3, each of the terminal devices 2a-2d transmits a question (a first request) to the center device 1 as shown in FIG. 2 (1) at the question time defined by the time schedule (S1: yes). In this operation, since each of the terminal devices 2a-2d starts communicating with respect to the center device 1, the communication through the router 4 can be performed.

The center device 1 then returns a response (a first response) with respect to the question (FIG. 2(2)). If request information is generated when returning the response, the response including the request information (the first response) is returned to the terminal device raising the question (any of 2a-2d). The center device 1 has a designation response means 15 (see FIG. 4A). When responding to each of the terminal devices 2a-2d, if request information for at least one of other terminal devices 2a-2d is also generated, the means 15 includes, in the response (first response), designation information for designating at least one of the other terminal devices 2a-2d to be provided with the request information in addition to the request information to the terminal device having transmitted the question. If the request information is not generated when the response is returned, empty information without request information is made.

Request information may be generated by remote operation from a client device communicating with the center device 1 through the communication line Lc of a wide area network, or cyclically generated in the center device 1, or generated by a request from the terminal devices 2a-2d or the like. In the explanation described below, the request information is used to instruct the control of an apparatus 3, but the request information for instructing monitoring of an apparatus 3 may be generated.

When the terminal device 2a transmits a question and thereby the request information to be given to the terminal device 2a and the request information to be given to the terminal device 2c are generated at the receipt time of the question in the center device 1, the request information to the terminal device 2a and the designation information for designating the terminal device 2c are included in a response to the terminal device 2a having transmitted the question.

From the center device 1, the terminal device 2a receives the response (first response), in which request information to the device 2a is included (S3: yes), and accordingly executes the processing corresponding to the request information. The response from the center device 1 also includes the designation information for instructing another terminal device 2c (S5: yes), and accordingly the designation information is transferred to the designated terminal device 2c as shown in FIG. 2(3) (S6). That is, each designation notice means 22 in the terminal devices 2a-2d is realized by the processing of steps S5 and S6.

If it is not question time when each of the terminal devices 2a-2d receives the designation information designating itself from any of other terminal devices 2a-2d (S1: no, S7: yes), a question (second question) is transmitted to the center device 1 regardless of the time schedule as shown in FIG. 2(4) (S2). That is, each interruption processing means 24 in the terminal devices 2a-2d is realized by the processing of steps S7 and S2. The center device 1 receives a question (a second request) from each of the terminal devices 2a-2d, and thereby returns request information as a response (a second response) with respect to the question to the terminal device (the destination). That is, in the example of FIG. 2, since the terminal device 2c is designated, the terminal device 2c transmits a question (a second request) to the center device 1, and the center device 1 returns a response (a second response) including request information to the terminal device 2c as shown in FIG. 2(5).

Thus, the terminal device 2c transmits a question to the center device 1 to obtain the request information, and subsequently executes the processing corresponding to the request information. As can be seen from FIG. 3, in the terminal devices 2a-2d, only the processing of steps S5-S7 is added to the conventional processing. Thereby, after request information is generated at the center device 1, request information (a second request) can be promptly transmitted to an object of the terminal devices 2a-2d without waiting for the chance of a question (a first question) from the terminal devices 2a-2d by the time schedules.

In case request information to the terminal devices 2a-2d is used to monitor the state of an apparatus 3, returning of monitoring content may be required. In this instance, each of the terminal devices 2a-2d only has to individually return monitoring information.

In the example shown in FIG. 2, after executing the processing corresponding to the request information (first response) and also transferring designation information to the terminal device 2c, the terminal device 2a only has to notify the center device 1 of monitoring information at the timing of the next question (first request). Similarly, after executing the processing corresponding to the request information received through the response (second response) from the center device 1, the terminal device 2c only has to notify the center device 1 of monitoring information at the timing of the next question (first request). When there is need to urgently return monitoring information, the monitoring information may be notified the center device 1 immediately after the processing with respect to the request information.

Thus, when request information to at least one of the terminal devices 2a-2d is generated, the center device 1 includes, in a response (a first response) with respect to the terminal device 2a-2d having transmitted the question, designation information designating at least one of the terminal devices 2a-2d which the request information is to be notified, regardless of any question (first request) from the terminal devices 2a-2d. The terminal device receiving a response (a first response) from the center device 1 notifies the designated another terminal device of the existence of request information at the center device 1 to cause the notified terminal device to transmit a question (a second request) to the center device 1. Accordingly, after request information is generated, the processing corresponding to the request information can be performed without delay.

When the schedule setting means 11 of the center device 1 determines a time schedule by which each of the terminal devices 2a-2d transmits a question, as discussed previously the number of the terminal devices 2a-2d may be considered so that each receiving interval of questions from the terminal devices 2a-2d is receiving interval in response to the processing ability of the center device 1. For example, if the center device 1 has the processing ability equal to questions at about 1-second receiving intervals, as discussed previously approximately one minute is defined as one cycle and time obtained by dividing the one cycle by the number of the terminal devices 2a-2d (15-second in four terminal devices 2a-2d) is used.

A load estimation means 12 may be provided. The means 12 measures a load of the CPU in the center device 1 to estimate (calculate) the processing load, and more lengthen each transmission interval of questions of the terminal devices 2a-2d as the processing load becomes larger. That is, there is a possibility that about 1-second receiving interval is not equal to the increased processing load of the center device 1. In this case, the schedule setting means 11 lengthens each transmission interval of the terminal devices 2a-2d, and thereby each time schedule is set so that the receiving interval of the center device 1 is also lengthened.

The center device 1 may be provided with a history storage means 13 for storing the history of transmitted request information (first and second responses) by terminal device. A history analytical means 14 may evaluate an occurrence frequency of request information per unit time based on the history stored in the history storage means 13 (a moving average value or the like is used), and set time schedules so that each terminal device has a shorter transmission interval as having a higher occurrence frequency.

For example, one day is divided into time periods such as before noon, afternoon (daytime), nighttime and so on, and thereby an occurrence frequency of request information per unit time may be evaluated by time period. In this instance, each time schedule can be set so that: in before noon, the transmission interval of the terminal device 2a is more shortened than that of each of other terminal devices 2b-2d; in the afternoon (daytime), the transmission interval of the terminal device 2b is more shortened than that of each of other terminal devices 2a, 2c and 2d; and in nighttime, each transmission interval of terminal devices 2c and 2d is more shortened than that of each of other terminal devices 2a and 2b. Dividing one day into time periods is one example, and division may be performed by day of the week or season.

Second Embodiment

In the first embodiment, designation information can be included in a response (a first response) with respect to each question (first request) of the terminal devices 2a-2d through the designation response means 15 in the center device 1. In the second embodiment, as shown in FIG. 4A, a request response means 16 is provided so that not only designation information but also request information as a second request can be included in a response (first response). If request information is with respect to the terminal device (any of 2a-2d) having transmitted a question (first request), the request information is included in a response (first response). In addition, if request information as a second request is with respect to another terminal device except the terminal having transmitted the question, a response selection means 17 selects an information type so that only one of designation information and request information (second request) is included in the response.

On the other hand, each of the terminal devices 2a-2d is provided with a response discrimination means 21 for deciding whether information except the request information to itself included in a response (first response) is designation information or request information (second request). The response discrimination means 21 detects if information to other terminal device(s) is included.

If the information is designation information, the designation notice means 22 notifies another terminal device of the designation information like the first embodiment. In the another terminal device, if the designation information is received, the interruption processing means 23 transmits a question (second request) to the center device 1 regardless of the time schedule.

If the information is request information (a second request), a request notice means 23 notifies another terminal device of the request information (second request). In the another terminal device, if the request information (second request) is received, a request processing means 25 executes the processing corresponding to the request information (second request). If the processing corresponding to the request information (second request) is completed, a completion notice means 26 transmits a second response including a completion notice to the center device 1.

Figure 5:
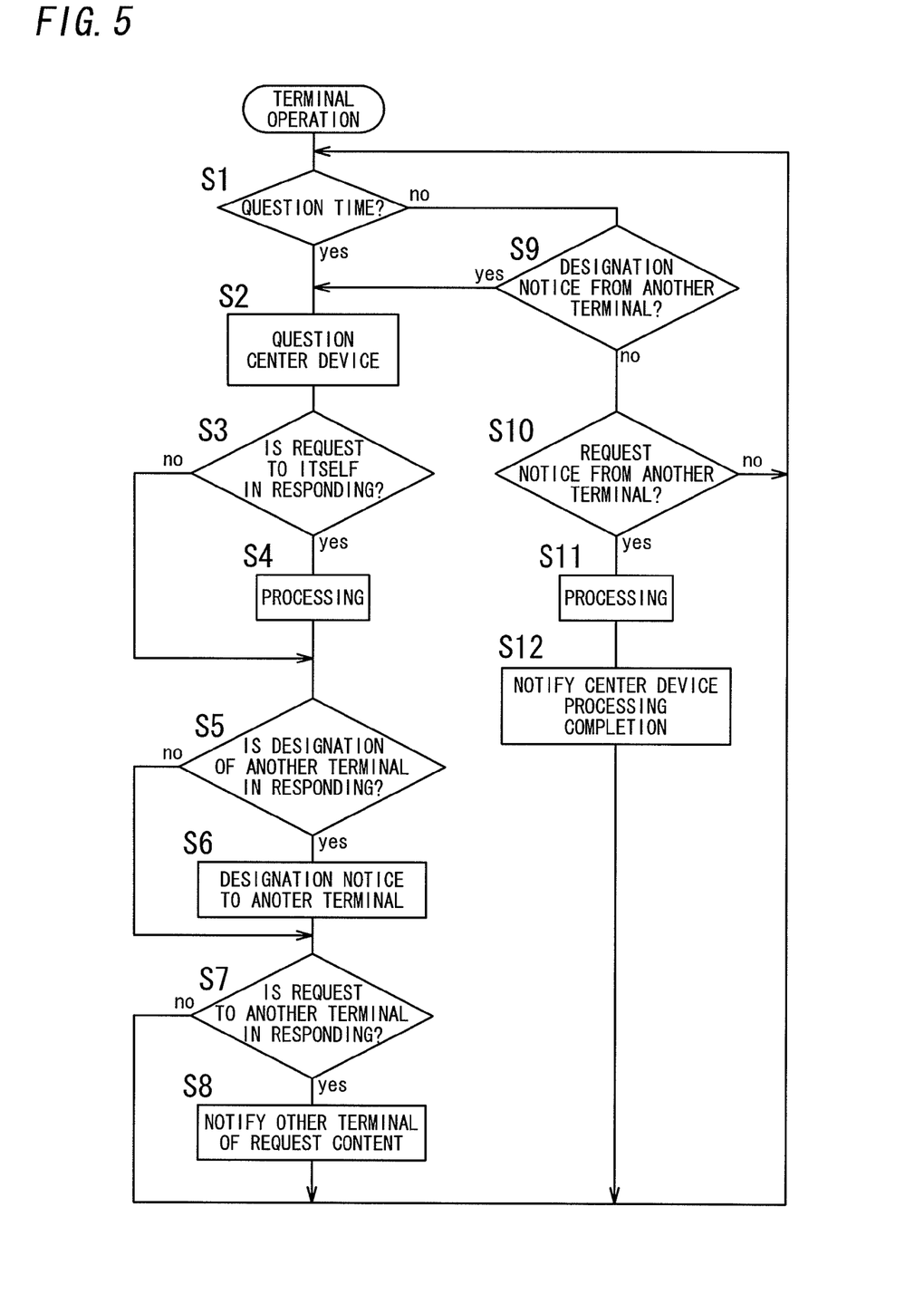
FIG. 5 is an explanatory diagram of operation of a terminal device in the second embodiment.

That is, as shown in FIG. 5, each of the terminal device 2a-2d transmits a question (a first request) to the center device 1 (S2) at the question time defined by the time schedule (S1: yes). The center device 1 then returns a response (a first response) with respect to the question. If request information is generated when the response is returned, the response (first response) including the request information is returned to the terminal device having transmitted the question. Request information (second request) or designation information to another terminal device is also included in the response as the need arises.

If each of the terminal devices 2a-2d receives a response (first response) including request information to itself from the center device 1 (S3: yes), it executes the processing corresponding to the request information (S4).

If designation information designating another terminal device is also included in the response (first response) from the center device 1 (S5: yes), the designation information is notified to the designated terminal device (S6). In addition, if request information (second request) to another terminal device is included in the response (first response) from the center device 1 (S7: yes), the request information (second request) is transferred to the another terminal device to be operated by the request information (second request) (S8).

If each of the terminal devices 2a-2d receives designation information from another terminal device (S9: yes) when it is not question time (S1: no), it transmits a question (second request) to the center device 1 regardless of the time schedule (S2). The center device 1 receives the question (second request) from the terminal device, and then returns request information as a response (second response) with respect to the question.

On the other hand, if request information (second request) is transferred from another terminal device when it is not question time (S1: no) (S10: yes), the processing corresponding to the request information is executed (S11), and subsequently a response (second response) including a completion notice of the processing is transmitted to the center device 1 (S12). The center device 1 receives the response including the completion notice, and thereby can obtain the response with respect to the request information (second request).

In the center device 1, which of designation information and request, information (second request) is included in a response (first response) is determined by type of request information to each of the terminal devices 2a-2d. For example, an urgency degree is used for the type of request information. The urgency degree is previously defined by the type of request information. Regarding request information having a short time from the generation of the request information to operation start by each of the terminal device 2a-2d according to the request information, the request information (second request) is included in the response (first response) and thereby another question to the center device 1 can be omitted and accordingly time can be saved.

For example, the urgency degree for request information becomes high in case an apparatus 3 having a high urgency degree is operated, such as in case a light fixture is used as an apparatus 3 in order to secure a escape route, or in case a siren sounding at the time of the crisis is used as an apparatus 3.

On the other hand, in case it is allowed that request information is obtained by another question to the center device 1, designation information is included in a response (first response) and thereby the information amount of the response can be reduced and each processing load of the terminal devices 2a-2d can be prevented from increasing.

After a response (first response) including designation information is transmitted from the center device 1, request information at the center device 1 may change and then have a high urgency degree with respect to the same terminal device. In this case, if the terminal device preferentially executes processing of the request information received from another terminal device, processing load can be always prevented from increasing by the notice of designation information, while the processing of request information having a high urgency degree can be preferentially executed. Other configurations and operations are the same as those of the first embodiment.

Although the present invention has been described with reference to certain preferred embodiments, numerous modifications and variations can be made by those skilled in the art without departing from the true spirit and scope of this invention.

The invention claimed is:

1. A monitoring system, comprising:
a plurality of terminal devices configured to be capable of communicating with each other;
a center device configured:
if receiving a first request from a terminal device at a specified time schedule, to return a first response including request information with respect to the terminal device; and thereby
to transmit the request information to the terminal device,
wherein the center device comprises a designation response means configured, when receiving a first request from any of the terminal devices, if having request information to be sent to another terminal device, to return a first response including designation information designating said another terminal device,
wherein each of the terminal devices comprises:
a designation notice means configured, when the designation information is included in the first response from the center device, to transfer the designation information to said another terminal device; and
an interruption processing means configured, if receiving designation information designating the terminal from a different one of the terminal devices, to transmit a second request to the center device.

2. The monitoring system of claim 1, comprising a router located at the side of the terminal devices between the terminal devices and the center device,
wherein the center device is configured, when including said designation information in the first response with respect to the first request from the terminal device, to limit a range to terminal devices under the same router as the terminal device having transmitted the first request, said range being a range of the terminal devices to which the designation information is to be transmitted.

3. The monitoring system of claim 2,
wherein each of the terminal devices comprises an identification data holding means for holding local identification data of each of terminal devices existing under the same router,
wherein said designation response means is configured, when including said designation information in said first response to the terminal device, to relate the designation information with the local identification data of said another terminal device existing under the same router as that of its own terminal device,
wherein said designation notice means is configured, if another terminal device's local identification data is included in said first response from the center device, to transfer designation information related to the local identification data to the terminal device having the local identification data.

4. The monitoring system of claim 3,
wherein the center device comprises a request response means configured to include, in said first response to the terminal device, request information as a second request with respect to another terminal device and address information of said another terminal device related to the request information,
wherein each of the terminal devices comprises a request notice means configured, if another terminal device's address information is included in said first response from the center device, to transfer request information as a second request related to the address information to the terminal device having the address information.

5. The monitoring system of any one of claims 1-4, wherein each time schedule of the terminal devices, for transmitting first requests to the center device, is set to a constant transmission interval per terminal device so that a terminal device has a shorter transmission interval as having a higher occurrence frequency of request information from the center device.

6. The monitoring system of claim 5,
wherein the center device comprises a history storage means for storing a history of transmitted request information by terminal device,
wherein the occurrence frequency of request information to each of the terminal devices is evaluated from the history stored in the history storage means,
wherein said transmission interval is changed in response to time change of the occurrence frequency.

7. The monitoring system of any one of claims 1-4,
wherein the center device comprises a schedule setting means configured:
(i) to evaluate the number of the terminal devices based on communication with each of the terminal devices;
(ii) to determine each time schedule of the terminal devices so that a transmission interval corresponds to the center device's processing ability based on the number of the terminal devices; and
(iii) to transmit a corresponding time schedule to each of the terminal devices.

8. The monitoring system of claim 7,
wherein each time schedule of the terminal devices, for transmitting a first request to the center device is set to a constant transmission interval per terminal device,
wherein the center device comprises a load estimation means configured to estimate its own processing load,
wherein said schedule setting means is configured, if obtaining a larger processing load from the load estimation means, to determine each time schedule of the terminal devices so that each transmission interval of the terminal devices is more lengthened.

9. The monitoring system of any one of claims 1-3,
wherein the center device comprises:
a request response means configured, when a first request is received from any of the terminal devices, if having request information as a second request to another terminal device, to return a first response including request information to said another terminal device; and
a response selection means configured, in response to a type of the request information as the second request, to select one of the designation response means and the request response means to transmit a first response to the terminal device,
wherein each of the terminal devices comprises:
a response discrimination means configured to decide whether the first response with respect to a first request includes designation information or request information as a second request;
a request notice means configured, when request information as a second request to another terminal device is included in a first response from the center device, to transfer the request information as the second request to said another terminal device; and
a request processing means configured, if request information as a second request is transferred from another terminal device, to execute the processing corresponding the request information.

10. The monitoring system of claim 9, wherein each of the terminal devices comprises a completion notice means configured, after executing the processing corresponding to the request information as the second request, to transmit a second response representing completion of the processing to the center device.

11. The monitoring system of claim 1, wherein each of the terminal devices comprises a monitored device.

12. A terminal device configured to operate in the monitoring system of claim 1, the terminal device comprising the designation notice means and the interruption processing means.

* * * * *